(12) United States Patent
Pu et al.

(10) Patent No.: US 10,342,077 B1
(45) Date of Patent: Jul. 2, 2019

(54) LED DRIVING CIRCUIT AND TUBE LAMP

(71) Applicant: CH Lighting Technology Co., Ltd., Shaoxing, Zhejiang Province (CN)

(72) Inventors: Jizhong Pu, Shaoxing (CN); Caiying Gan, Shaoxing (CN); Jiaming Zhou, Shaoxing (CN)

(73) Assignee: CH LIGHTING TECHNOLOGY CO., LTD., Shaoxing (CN)

( * ) Notice: Subject to any disclaimer, the term of this patent is extended or adjusted under 35 U.S.C. 154(b) by 0 days.

(21) Appl. No.: 16/136,447

(22) Filed: Sep. 20, 2018

(30) Foreign Application Priority Data

Jul. 4, 2018  (CN) .......................... 2018 1 0724649

(51) Int. Cl.
| | |
|---|---|
| *H05B 33/08* | (2006.01) |
| *H02M 7/219* | (2006.01) |
| *F21V 23/02* | (2006.01) |
| *F21V 25/00* | (2006.01) |
| *F21V 23/00* | (2015.01) |
| *F21Y 115/10* | (2016.01) |

(52) U.S. Cl.
CPC ....... *H05B 33/0809* (2013.01); *F21V 23/001* (2013.01); *F21V 23/02* (2013.01); *F21V 25/00* (2013.01); *H02M 7/219* (2013.01); *H05B 33/0887* (2013.01); *F21Y 2115/10* (2016.08)

(58) Field of Classification Search
CPC ................ H05B 33/08; H05B 33/0809; H05B 33/0845; H05B 33/0887; H05B 37/02; F21V 23/00; F21V 23/02; F21V 25/00; F21Y 2115/10; H02M 7/219
See application file for complete search history.

(56) References Cited

U.S. PATENT DOCUMENTS

2013/0155561 A1* 6/2013 Lai .......................... H02H 3/202
361/91.5

* cited by examiner

*Primary Examiner* — Jimmy T Vu
(74) *Attorney, Agent, or Firm* — McDonald Hopkins LLC

(57) ABSTRACT

Provided are an LED driving circuit and a tube lamp. A grounding terminal of a rectifying unit of the LED driving circuit is electrically connected to a first ground wire, and an input terminal of an impedance detection and protection unit is electrically connected to a second input terminal of a first filtering unit. The grounding terminal is electrically connected to the first ground wire. The impedance detection and protection unit is configured to detect an impedance between the second input terminal of the first filtering unit and the first ground wire, so as to control the second input terminal of the first filtering unit to connect to or disconnect from the first ground wire according to a magnitude of the detected impedance.

11 Claims, 8 Drawing Sheets

US 10,342,077 B1

LED DRIVING CIRCUIT AND TUBE LAMP

CROSS-REFERENCE TO RELATED APPLICATIONS

This application claims priority to a Chinese patent application No. 201810724649. 6 filed on Jul. 4, 2018, the disclosure of which is incorporated herein by reference in its entirety.

TECHNICAL FIELD

The present disclosure relates to an LED illumination technology, and in particular relates to an LED driving circuit and a tube lamp.

BACKGROUND

A light emitting diode (LED) has characteristics of low current consumption and long service life. A universalization rate and a market share of LED illumination devices in the field of illumination are becoming higher and higher.

Various LED illumination devices may have matching problems with a traditional lamp holder in practical use. Some problems are structural problems, but mainly are electrical matching problems. When fluorescent lamps are replaced with LED lamps, if all of original fluorescent lamps are entirely replaced, no electrical connection problem exists since the LED lamps are directly connected to mains supply. However, during overall replacement, a ceiling needs to be redrilled for installation, causing certain troubles. When LED light sources replace traditional light sources (such as high intensity discharge (HID) lamps or the fluorescent lamps), since lamp heads are standard lamp heads, no structural problem exists. However, electrical connection has many problems, and improper treatment may even cause electric shock of people, which threatens human life and health. This problem is particularly obvious in LED straight lamps. In real life, a lot of straight fluorescent lamps exist. These lamps will be replaced with the LED straight lamps due to various reasons such as normal damage or energy conservation transformation and the like.

When the LED straight lamps are used to replace the fluorescent lamps, two solutions are mainly used at present The first solution is, an LED driving circuit is placed in a tube lamp of an LED tube lamp. The second solution is, the LED driving circuit is placed outside the tube lamp of the LED tube lamp. A drive built-in LED tube lamp (i.e., the first solution) may have a solution of directly replacing the straight fluorescent lamps and a solution of modifying circuits of the original lamps. Moreover, LED lamp tubes are classified into a single-terminal power supply type and a double-terminal power supply type. It can be seen that, during practical use of the LED lamp tubes, complex situations may exist.

Safer use for a user shall be considered when the LED lamp tubes of different types are used. To solve safety problem, a solution of installing a mechanical switch at the lamp head is commonly adopted in an existing art. When the lamp head is clamped into a lamp holder, the switch is turned on and the LED tube lamp can be used normally. When the lamp head is removed, the switch is turned off. Even if an operator touches the lamp head, electric shock will not occur. However, when the LED tube lamp is installed by the user, the user may press the switch, causing the switch to be in a conduction state, and an electric shock danger may occur. Moreover, this design imposes a structural burden. Since a gap exists when the lamp head contacts the lamp holder directly, the lamp head is installed on the lamp holder actually but the switch is not turned on, causing that the lamp does not illuminate. Moreover, the LED tube lamp is different from the traditional fluorescent lamp. When a lamp wall of the LED lamp tube is damaged, the lamp can be used normally, but electric shock danger may exist when people touch the lamp. Therefore, the existing LED lamp tube has a great potential safety hazard.

SUMMARY

The present disclosure provides an LED driving circuit and a tube lamp, so as to reduce a potential safety hazard of the LED tube lamp and improve safety performance of the LED tube lamp.

In a first aspect, embodiments of the present disclosure provide an LED driving circuit.

The LED driving circuit includes:

a rectifying unit including an input terminal, an output terminal and a grounding terminal, and a grounding terminal of the rectifying unit is electrically connected to a first ground wire;

a first filtering unit including a first input terminal, a second input terminal and an output terminal, and the first input terminal of the first filtering unit is electrically connected to the output terminal of the rectifying unit;

a voltage converting unit including an input terminal and an output terminal, wherein the input terminal of the voltage converting unit is electrically connected to the output terminal of the first filtering unit; the voltage converting unit is configured to convert a direct current voltage inputted to the input terminal of the voltage converting unit into another or multiple direct current voltages, and the converted voltages are outputted from the output terminal of the voltage converting unit; and an impedance detection and protection unit including an input terminal and a grounding terminal, wherein the input terminal of the impedance detection and protection unit is electrically connected to the second input terminal of the first filtering unit, the grounding terminal of the impedance detection and protection unit is electrically connected to the first ground wire; and the impedance detection and protection unit is configured to detect an impedance between the second input terminal of the first filtering unit and the first ground wire, so as to control the second input terminal of the first filtering unit to connect to or disconnect from the first ground wire according to a magnitude of the detected impedance.

In one embodiment, the impedance detection and protection unit is configured to control the second input terminal of the first filtering unit to disconnect from the first ground wire when the impedance between the second input terminal between the first filtering unit and the first ground wire detected by the impedance detection and protection unit is greater than a human impedance; and the impedance detection and protection unit is configured to control the second input terminal of the first filtering unit to connect to the first ground wire when the impedance between the second input terminal of the first filtering unit and the first ground wire detected by the impedance detection and protection unit is less than the human impedance.

In one embodiment, the impedance detection and protection unit is configured to control the second input terminal of the first filtering unit to disconnect from the first ground wire when the impedance between the second input terminal of the first filtering unit and the first ground wire detected by the impedance detection and protection unit is not less than 500 ohms; and the impedance detection and protection unit is configured to control the second input terminal of the first filtering unit to connect to the first ground wire when the impedance between the second input terminal of the first filtering unit and the first ground wire is less than 500 ohms.

In one embodiment, the impedance detection and protection unit includes an impedance detection chip, a first resistor, a second resistor, a third resistor and a fourth resistor, and the impedance detection chip includes a power input terminal, a first voltage monitoring terminal, a second voltage monitoring terminal, a current monitoring terminal, an isolation input terminal and a grounding terminal.

The power input terminal of the impedance detection chip is electrically connected to the output terminal of the rectifying unit through the first resistor, the first voltage monitoring terminal is electrically connected to the isolation input terminal through the second resistor, both terminals of the third resistor are electrically connected to the first voltage monitoring terminal and the second voltage monitoring terminal respectively, and the current monitoring terminal is electrically connected to the first ground wire through the fourth resistor.

The impedance detection chip can control connection or disconnection between the isolation input terminal and the grounding terminal.

In one embodiment, the rectifying unit includes a first rectifying unit and a second rectifying unit, and the first rectifying unit includes two input terminals and two output terminals.

The two input terminals of the first rectifying unit are electrically connected to two first power input terminals of the LED driving circuit respectively; one of the two output terminals of the first rectifying unit is electrically connected to the first input terminal of the first rectifying unit, and another of the two output terminals of the first rectifying unit is electrically connected to the first ground wire. Two input terminals of the second rectifying unit are electrically connected to two second power input terminals of the LED driving circuit respectively, and one of two output terminals of the second rectifying unit is electrically connected to the first input terminal of the first rectifying unit, and another of the two output terminals of the second rectifying unit is electrically connected to the first ground wire.

In one embodiment, the LED driving circuit further includes a first capacitor and at least one short circuit protection unit; the first capacitor is electrically connected between the two input terminals of the second rectifying unit, and the short circuit protection unit is connected in series between at least one of the two input terminals of the second rectifying unit and the second power input terminals of the LED driving circuit.

In one embodiment, the first filtering unit includes a second capacitor, a third capacitor, a first inductor, a second inductor, a fifth resistor and a sixth resistor.

The first capacitor is electrically connected between the output terminal of the rectifying unit and the second input terminal of the impedance detection and protection unit, and the second capacitor is electrically connected between the input terminal of the voltage converting unit and a second ground wire.

The first inductor is connected with the fifth resistor in parallel, a first terminal of the first inductor is electrically connected to the output terminal of the rectifying unit; and a second terminal of the first inductor is electrically connected to the input terminal of the voltage converting unit.

The second inductor is connected with the sixth resistor in parallel; a first terminal of the second inductor is electrically connected to the second input terminal of the impedance detection and protection unit, and a second terminal of the second inductor is electrically connected to the second ground wire.

In one embodiment, the output terminal of the first rectifying unit includes a first output terminal and a second output terminal, and the second output terminal of the first filtering unit is electrically connected to the second ground wire.

The LED driving circuit further includes a second filtering unit, and the voltage converting unit further includes a first control chip, a transformer and a first switch unit.

A first terminal of a primary coil of the transformer is electrically connected to the first output terminal of the first filtering unit and the first terminal of the second filtering unit through a first diode, and a second terminal of the primary coil is electrically connected to the second terminal of the second filtering unit.

A first terminal of the first switch unit is electrically connected to the first terminal of the primary coil, and a second terminal of the first switch unit is electrically connected to the second ground wire through a seventh resistor.

A control signal output terminal of the first control chip is electrically connected to a control terminal of the first switch unit.

In one embodiment, the LED driving circuit further includes a frequency detection unit and a second switch unit, and the first control chip further includes a control signal input terminal.

An input terminal of the frequency detection unit is electrically connected to the input terminal of the rectifying unit, and a control signal output terminal of the frequency detection unit is electrically connected to the control signal input terminal of the first control chip and a control terminal of the second switch unit.

A first terminal of the second switch unit is electrically connected to the second terminal of the primary coil of the transformer, and a second terminal of the second switch unit is electrically connected to the first ground wire.

In one embodiment, the frequency detection unit includes a fourth capacitor, a fifth capacitor, a second diode, a third diode, an eighth resistor and a zener diode.

A first terminal of the fourth capacitor is electrically connected to the input terminal of the rectifying unit, a second terminal of the third capacitor is electrically connected to a cathode of the third diode, and an anode of the third diode is electrically connected to the first ground wire.

An anode of the second diode is electrically connected to the cathode of the third diode, a cathode of the second diode is electrically connected to a cathode of the zener diode, and an anode of the zener diode is electrically connected to the first ground wire.

The fifth capacitor and the eighth resistor are connected with the zener diode in parallel.

In a second aspect, embodiments of the present disclosure further provide a tube lamp. The tube lamp includes the LED driving circuit of any embodiment of the present disclosure.

DETAILED DESCRIPTION

The present description will be further described in detail below in combination to drawings and embodiments. It should be understood that, specific embodiments described herein are merely used for explaining the present disclosure, not used for limiting the present disclosure. In addition, it should be noted that, for ease of description, drawings merely show some portions related to the present disclosure rather than whole structures.

Figure 1:
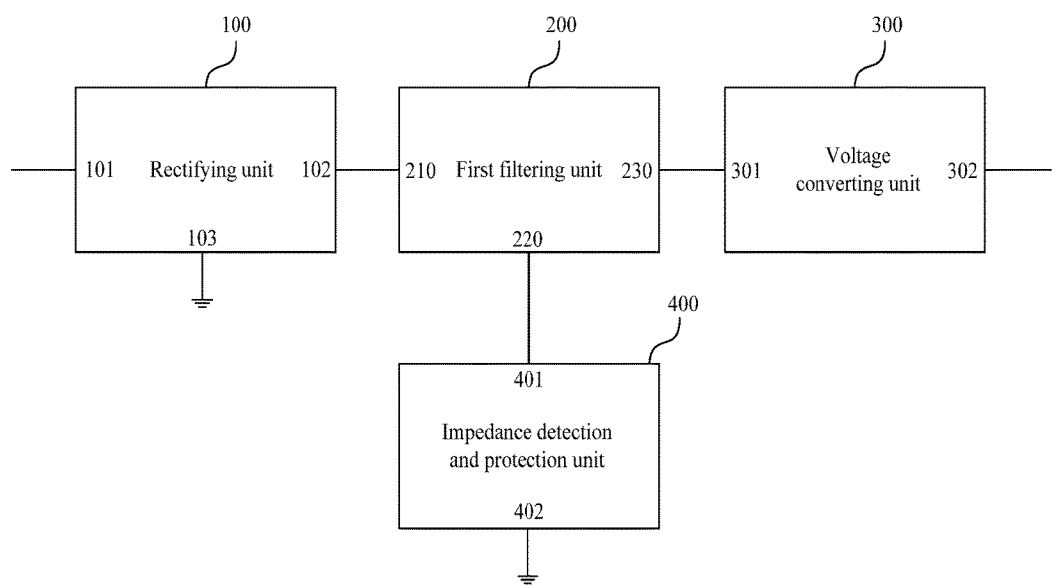
FIG. 1 is a circuit diagram illustrating an LED driving circuit provided by an embodiment of the present disclosure.

FIG. 1 is a circuit diagram illustrating an LED driving circuit provided by an embodiment of the present disclosure. By referring to FIG. 1, the LED driving circuit includes: a rectifying unit 100, a first filtering unit 200, a voltage converting unit 300 and an impedance detection and protection unit 400. The rectifying unit 100 includes an input terminal 101, an output terminal 102 and a grounding terminal 103. The grounding terminal 103 of the rectifying unit 100 is electrically connected to a first ground wire. The first filtering unit 200 includes a first input terminal 210, a second input terminal 220 and an output terminal 230. The first input terminal 210 of the first filtering unit 200 is electrically connected to the output terminal 102 of the rectifying unit 100. The voltage converting unit 300 includes an input terminal 301 and an output terminal 302. The input terminal 301 of the voltage converting unit 300 is electrically connected to the output terminal 230 of the first filtering unit 200. The voltage converting unit 300 is configured to convert a direct current voltage inputted to the input terminal 301 of the voltage converting unit 300 into another or multiple direct current voltages. The converted voltages are outputted from the output terminal 302 of the voltage converting unit 300. The impedance detection and protection unit 400 includes an input terminal 401 and a grounding terminal 402. The input terminal 401 of the impedance detection and protection unit 400 is electrically connected to the second input terminal 220 of the first filtering unit 200. The grounding terminal 402 of the impedance detection and protection unit 400 is electrically connected to the first ground wire. The impedance detection and protection unit 400 is configured to detect an impedance of the second input terminal 220 of the first filtering unit 200 for the first ground wire, so as to control the second input terminal 220 of the first filtering unit 200 to connect to or disconnect from the first ground wire according to a magnitude of the detected impedance.

Figure 2:
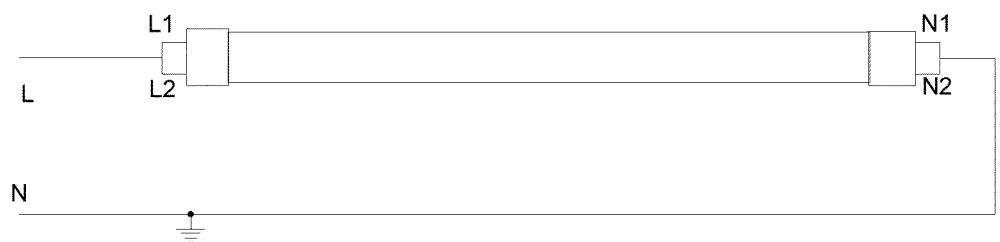
FIG. 2 is a wiring diagram when an LED tube lamp is operated normally in an embodiment of the present disclosure.
Figure 3:
FIG. 3 is a wiring diagram illustrating an LED tube lamp in case of human electric shock provided by an embodiment of the present disclosure.
Figure 4:
FIG. 4 is an equivalent wiring diagram of FIG. 3.
Figure 5:
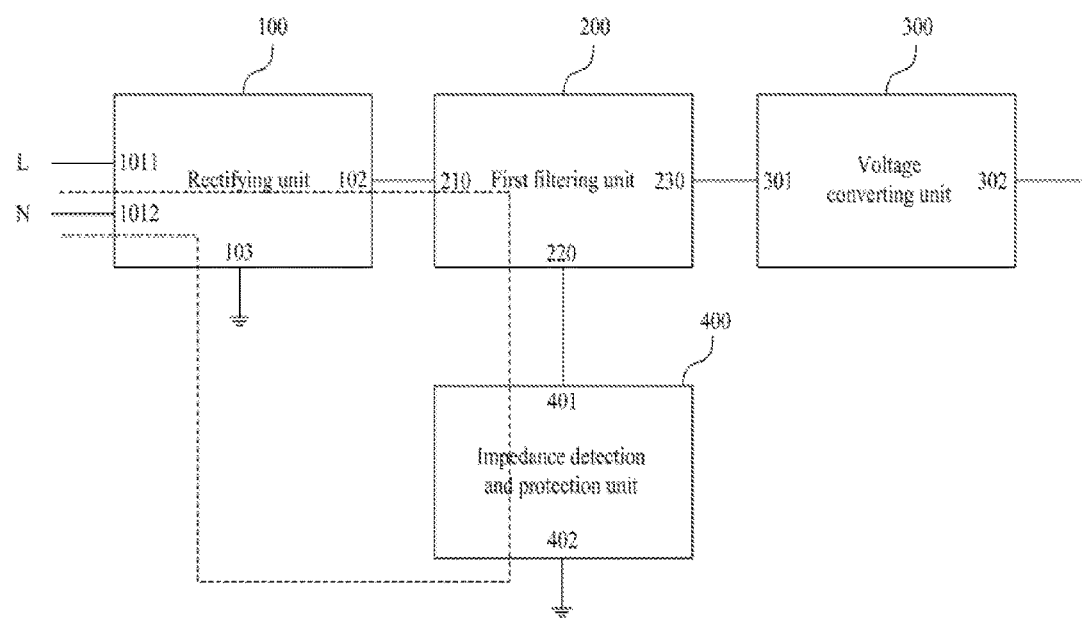
FIG. 5 is a schematic diagram illustrating a current loop formed when human electric shock occurs by an LED tube lamp in an embodiment of the present disclosure.
Figure 6:
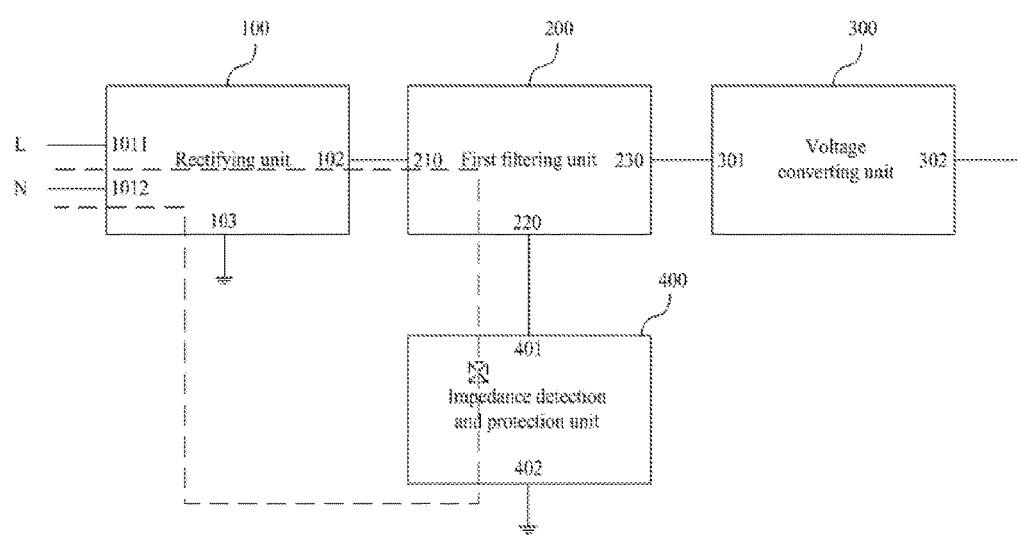
FIG. 6 is a schematic diagram illustrating disconnection of a current loop after circuit protection for an LED tube lamp provided in an embodiment of the present disclosure.

The rectifying unit 100 may be a rectifier circuit unit commonly used in the technical field, such as a bridge rectifier circuit unit. The voltage converting unit 300 may convert one direct current voltage into another one or multiple direct current voltages through a current converting technique. The output terminal of the voltage converting unit 300 may be connected to an LED lamp on the lamp tube. In order to describe a working principle of the LED driving circuit provided by embodiments of the present disclosure more clearly, the LED driving circuit is configured in the lamp tube for description. Exemplarily, FIG. 2 is a wiring diagram when an LED tube lamp is operated normally in an embodiment of the present disclosure. By referring to FIG. 1 and FIG. 2, the rectifying unit 100 of the LED driving circuit rectifies alternating current voltage of mains supply (in FIG. 2, L indicates a live wire, N indicates a neutral line, and L1, L2, N1 and N2 respectively indicate four lamp feet of the LED tube lamp) inputted to the input terminal 101 into direct current voltage, the voltage converting unit 300 converts the direct current voltage into another one or multiple direct current voltages, and the LED lamp is powered through the output terminal 302 of the voltage converting unit 300. The first filtering unit 200 is configured to eliminate EMI in the circuit to enable the LED lamp to illuminate normally. The grounding terminal 103 of the rectifying unit 100 is electrically connected to the first ground wire, and the input terminal 401 of the impedance detection and protection unit 400 is conducted to the grounding terminal 402. That is, the second input terminal 220 of the first filtering unit 200 and the first ground wire are in a conduction state, so that the rectifying unit 100, the first filtering unit 200, the voltage converting unit 300 and the LED lamp form a loop through the first ground wire. That is, the alternating current voltage of mains supply and the LED lamp form the loop and the LED tube lamp is operated normally. Meanwhile, the impedance detection and protection unit 400 detects the impedance between the second input terminal 220 of the first filtering unit 200 and the first ground wire in real time, and the impedance reflects a power grid impedance. FIG. 3 is a wiring diagram illustrating an LED tube lamp in case of human electric shock provided by an embodiment of the present disclosure. FIG. 4 is an equivalent wiring diagram of FIG. 3. By referring to FIG. 1, FIG. 3 and FIG. 4, when an operator suffers from electric shock, a contact human resistor Req is connected to the loop of the circuit, and the loop is formed from the live wire L, the rectifying unit 100 and the first filtering unit 200 to a human body. If the impedance between the second input terminal 220 of the first filtering unit 200 and the first ground wire is abnormal and the impedance detection and protection unit 400 detects that the impedance between the second input terminal 220 of the first filtering unit 200 and the first ground wire is abnormal, then the input terminal 401 of the impedance detection and protection unit 400 is disconnected from the grounding terminal 402. That is, the second input terminal 220 of the first filtering unit 200 and the first ground wire are in a disconnection state and the loop from the live wire L, the rectifying unit 100 and the first filtering unit 200 to the human body is disconnected, thereby achieving electric shock protection and ensuring personal safety. By referring to FIG. 5 and FIG. 6, FIG. 5 is a schematic diagram illustrating a current loop formed when human electric shock occurs by an LED tube lamp in an embodiment of the present disclosure, and FIG. 6 is a schematic diagram illustrating disconnection of a current loop after circuit protection for an LED tube lamp provided in an embodiment of the present disclosure. Specifically, the input terminal of the rectifying unit 100 in FIG. 5 and FIG. 6 includes a first input terminal 1011 and a second input terminal 1012, and the first input terminal 1011 and the second input terminal 1012 are respectively electrically connected to the live line L and the neutral line N. It can be seen that, since the input terminal 401 of the impedance detection and protection unit 400 is disconnected from the grounding terminal 402, the loop formed by human electric shock is disconnected, thereby achieving electric shock protection.

It should be noted that, the input terminal 401 of the impedance detection and protection unit 400 in the present embodiment of the present disclosure is connected behind a rectifying circuit (the rectifying unit 100) and in front of a filtering circuit (the first filtering unit 200), and an influence of the impedances in the first filtering unit 200 and the voltage converting circuit unit 300 on the impedance detected by the impedance detection and protection unit 400 can be reduced. That is, the impedance detection and protection unit 400 detects that the impedance reflects a normal impedance of a power grid and an abnormal impedance of the power grid after human electric shock in real time, thereby accuracy of action protection of the impedance detection and protection unit 400 is improved. Relative to a manner of detecting voltage or current for electric shock protection, when detecting the voltage or the current for electric shock protection, the voltage or the current fluctuates greatly and is easy to be influenced by load change, so that detection is not accurate and electric shock protection is easy to generate misoperation or cannot perform reliable protection. However, through a manner of detecting the impedance for protection, protection accuracy and reliability can be improved.

In embodiments of the present embodiment, the grounding terminal 103 of the rectifying unit 100 is electrically connected to the first ground wire, and the input terminal 401 of the impedance detection and protection unit 400 is electrically connected to the second input terminal 220 of the first filtering unit 200, the grounding terminal 401 is electrically connected to the first ground wire, and the impedance detection and protection unit 400 is configured to detect the impedance between the second input terminal 220 of the first filtering unit 200 and the first ground wire, so as to control the second input terminal 220 of the first filtering unit 200 to connect to or disconnect from the first ground wire according to a magnitude of the detected impedance. Compared to the existing art in which a mechanical switch is adopted, which enables the LED lamp tube to have a great potential safety hazard, embodiments of the present disclosure achieve electric shock protection by means of the design of the LED driving circuit, and can disconnect the entire loop once detecting an electric shock risk, thereby reducing the risk and the potential safety hazard when a user uses the LED tube lamp and improving the safety performance of the LED tube lamp.

Based on above embodiments, In one embodiment, the impedance detection and protection unit 400 is configured to control the second input terminal 220 of the first filtering unit 200 to disconnect from the first ground wire when the impedance between the second input terminal 220 of the first filtering unit 200 and the first ground wire detected by the impedance detection and protection unit 400 is greater than a human impedance; and the impedance detection and protection unit 400 is configured to control the second input terminal 220 of the first filtering unit 200 to connect to the first ground wire when the impedance between the second input terminal 220 of the first filtering unit 200 and the first ground wire detected by the impedance detection and protection unit 400 is less than the human impedance, thereby achieving electric shock protection and ensuring personal safety.

Based on above embodiments, In one embodiment, the impedance detection and protection unit 400 is configured to control the second input terminal 220 of the first filtering unit 200 to disconnect from the first ground wire when the impedance between the second input terminal 220 of the first filtering unit 200 and the first ground wire detected by the impedance detection and protection unit 400 is greater than or equal to 500 ohms; and the impedance detection and protection unit 400 is configured to control the second input terminal 220 of the first filtering unit 200 to connect to the first ground wire when the impedance between the second input terminal 220 of the first filtering unit 200 and the first ground wire detected by the impedance detection and protection unit 400 is less than 500 ohms. Since the human impedance is generally 500 ohms, the impedance detection and protection unit 400 can achieve electric shock protection for the human body and ensure personal safety through such configuration.

It should be noted that, in above embodiments, a safety impedance between the second input terminal 220 of the first filtering unit 200 between the first ground wire is set to be less than 500 ohms, which is not a limitation to the present disclosure. In practical application, the magnitude of the impedance can be adjusted according to a safety level of the LED driving circuit, and is not limited in the present disclosure.

Specifically, UL standard established by Underwriter Laboratories Inc. (UL) is that, the current after human electric shock is less than 5 mA, and the requirement can be satisfied. In practical application, the safety impedance between the second input terminal 220 of the first filtering unit 200 and the first ground wire can be determined according to the UL standard and a voltage level of the actual LED driving circuit.

Figure 7:
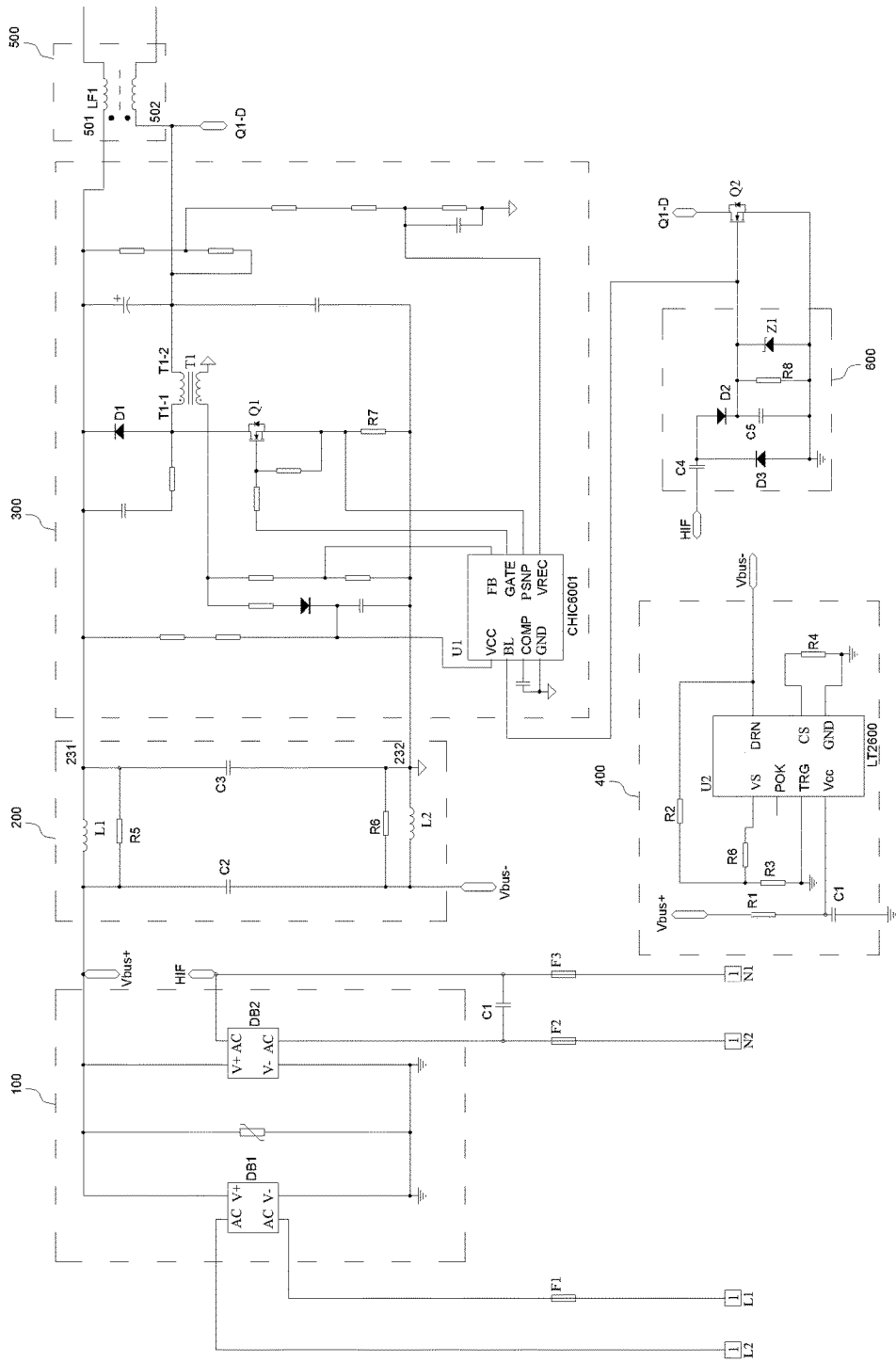
FIG. 7 is a circuit diagram illustrating another LED driving circuit provided by an embodiment of the present disclosure.

FIG. 7 is a circuit diagram illustrating another LED driving circuit provided by an embodiment of the present disclosure. By referring to FIG. 7, based on above embodiments, In one embodiment, the impedance detection and protection unit 400 includes an impedance detection chip U2, a first resistor R1, a second resistor R2, a third resistor R3 and a fourth resistor R4 (sampling resister). The impedance detection chip U2 includes a power input terminal Vcc, a first voltage monitoring terminal VS, a second voltage monitoring terminal TRG, a current monitoring terminal CS, an isolation input terminal DRN and a grounding terminal GND. The power input terminal Vcc is electrically connected to the output terminal of the rectifying unit 100 through the first resistor R1 (in FIG. 7, Vbus+ is used to indicate a signal at the output terminal of the rectifying unit 100), the first voltage monitoring terminal VS is electrically connected to the isolation input terminal DRN through the second resistor R2. Two terminals of the third resistor R3 are electrically connected to the first voltage monitoring terminal VS and the second voltage monitoring terminal TRG respectively, and the current monitoring terminal CS is electrically connected to the first ground wire through the fourth resistor R4. The impedance detection chip U2 can control connection or disconnection between the isolation input terminal DRN and the grounding terminal GND.

Exemplarily, when the first power input terminals Vcc normally receives a working voltage and the LED tube lamp is operated normally, the current monitoring terminal CS of the impedance detection chip U2 continuously collects the current between the second input terminal of the first filtering unit 200 and the first ground wire (in FIG. 7, Vbus− is used to indicate a signal at the second input terminal of the first filtering unit 200), and the first voltage monitoring terminal VS and the second voltage monitoring terminal TRG continuously collect the voltage between the second input terminal of the first filtering unit 200 and the first ground wire, so as to compute the power grid impedance between the second input terminal of the first filtering unit 200 and the first ground wire. If it is judged that the impedance is within a normal range, the isolation input terminal DRN and the current monitoring terminal CS are conducted and the current flows through the sampling resistor of the current monitoring terminal CS and forms a path to the first ground wire. Otherwise, if it is judged that the impedance is within an abnormal range, the isolation input terminal DRN and the current monitoring terminal CS are disconnected and the second input terminal of the first filtering unit 200 and the first ground wire are disconnected, thereby achieving electric shock protection and ensuring personal safety.

Still referring to FIG. 7, based on above embodiments, In one embodiment, a model of the impedance detection chip U2 is LT2600. The LT2600 further includes an MOS transistor and a control terminal POK. A control terminal of the MOS transistor is electrically connected to the control terminal POK of LT2600. A first terminal of the MOS transistor is electrically connected to the isolation input terminal DRN of LT2600. A second terminal of the MOS transistor is electrically connected to the current monitoring terminal CS of LT2600. If it is judged that the impedance is within a normal range, then the first voltage monitoring terminal VS outputs a low level, the control terminal POK is normal, the MOS transistor is conducted and the isolation input terminal DRN and the current monitoring terminal CS are conducted. Otherwise, if it is judged that the impedance is within an abnormal range, then the voltage at the control terminal POK is lowered, the MOS transistor is disconnected and the isolation input terminal DRN and the current monitoring terminal CS are disconnected, thereby achieving electric shock protection and ensuring personal safety.

Still referring to FIG. 7, based on above embodiments, In one embodiment, the rectifying unit 100 further includes a first rectifying unit DB1 and a second rectifying unit DB2. The first rectifying unit DB1 includes two input terminals (which are both indicated by AC) and two output terminals (which are indicated by V+ and V−). The two input terminals of the first rectifying unit DB1 are electrically connected to two first power input terminals of the LED driving circuit respectively (the two first power input terminals are respectively connected to two lamp feet L1 and L2 of the LED lamp tube). One of the two output terminals of the first rectifying unit DB1 is electrically connected to the first input terminal of the first filtering unit 200, and another of the two output terminals of the first rectifying unit DB1 is electrically connected to the first ground wire. Two input terminals of the second rectifying unit DB2 are electrically connected to two second power input terminals of the LED driving circuit respectively (the two second power input terminals are respectively connected to the two lamp feet L1 and L2 of the LED lamp tube). One of two output terminals of the second rectifying unit DB2 is electrically connected to the first input terminal of the first filtering unit 200, and another of the two output terminals of the second rectifying unit DB2 is electrically connected to the first ground wire. The LED driving circuit is applicable to LED straight lamps. Both terminals of a lamp holder of an existing fluorescent straight lamp are respectively provided with two lamp foot interfaces. The LED driving circuit in embodiments of the present invention is configured to include two first power input terminals and two second power input terminals. The two first power input terminals are electrically connected to two lamp feet at one terminal of the lamp tube, and the two second power input terminals are electrically connected to two lamp feet at the other terminal of the lamp tube, so as to match with the existing lamp holder.

Still referring to FIG. 7, based on above embodiments, In one embodiment, the LED driving circuit also includes a first capacitor C1 and at least one short circuit protection unit. The first capacitor C1 is electrically connected between two input terminals of the second rectifying unit DB2. The short circuit protection unit is connected in series between at least one of the second rectifying unit DB2 and the second power input terminals of the LED driving circuit (FIG. 7 exemplarily shows two short circuit protection units, respectively indicated by F2 and F3). The short circuit protection units may be fuses.

Existing fluorescent straight lamps include a single-terminal input case and a double-terminal input case. Embodiments of the present disclosure are applicable not only to the single-terminal input case, but also to the double-terminal input case. If the existing lamp holder is the single-terminal input case, then two lamp foot interfaces located at one end of the lamp holder are electrically connected to the live wire and the neutral line respectively and two lamp foot interfaces located at the other end of the lamp holder are not wired. When the lamp feet connected to the live wire and the neutral line are electrically connected to the two first power input terminals of the LED driving circuit, the LED lamp tube is installed correctly. The first rectifying unit DB1 is operated normally, the two second power input terminals have no power input, the second rectifying unit DB2 is not operated, and the first rectifying unit DB1 rectifies the alternating current voltage of the mains supply into a direct current voltage. When the lamp feet connected to the live wire and the neutral line are electrically connected to the two second power input terminals of the LED driving circuit, the LED lamp tube is installed incorrectly. Since the first capacitor C1 has a function of isolating direct current and conducting alternating current, the first capacitor C1 is connected between the live wire and the neutral line, which is equivalent to short-circuit between live wire and the neutral line. The circuit is disconnected by the short circuit protection unit, and is in a safety state. The LED tube lamp does not illuminate, so as to play a role of prompting the operator that the LED lamp tube is installed incorrectly. At this moment, the operator only needs to change a direction of the LED lamp tube to insert the lamp holder, so as to normally use the LED tube lamp. If the existing lamp holder is the double-terminal input case, then one of the two lamp foot interfaces located at one terminal of the lamp holder is electrically connected to the live wire or both of the two lamp foot interfaces are electrically connected to the live wire, one of the two lamp foot interfaces located at the other terminal of the lamp holder is electrically connected to the neutral line or the two lamp foot interfaces located at the other terminal of the lamp holder are respectively electrically connected to the neutral line. The lamp feet at both terminals of the LED lamp tube are not distinguished, reverse installation will not occur in the installation of the LED lamp tube, and the circuit is operated normally. When the LED lamp tube is installed on the existing lamp holder in embodiments of the present disclosure, not only direct structural installation is achieved, but also electrical connection is normal, thereby extending an application scope of the LED tube lamp.

Figure 8:
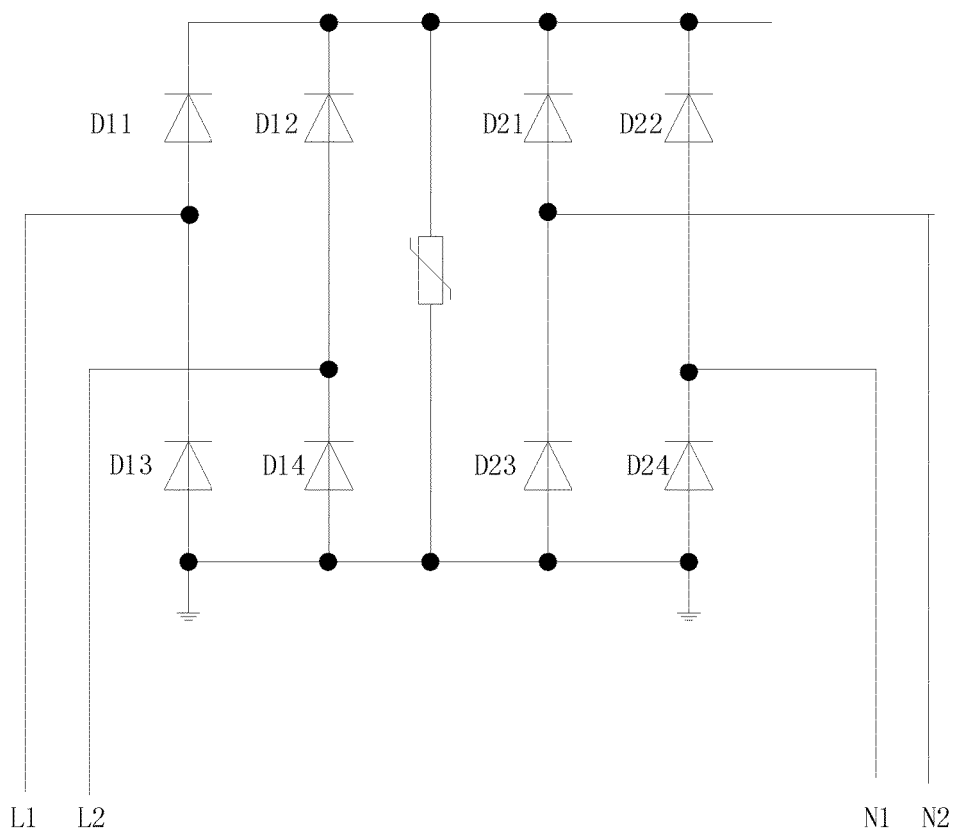
FIG. 8 is a circuit diagram illustrating a bridge rectifier circuit adopted by a first rectifying unit and a second rectifying unit provided by an embodiment of the present disclosure.

Based on above embodiments, In one embodiment, the first rectifying unit DB1 and the second rectifying unit DB2 are bridge rectifier circuits. By referring to FIG. 8, FIG. 8 is a circuit diagram illustrating a bridge rectifier circuit adopted by a first rectifying unit and a second rectifying unit provided by an embodiment of the present disclosure. Diodes D11, D12, D13 and D14 form the first rectifying unit. Diodes D21, D22, D23 and D24 form the second rectifying unit. When the existing lamp holder is the double-terminal input case, one of the two lamp foot interfaces located at one terminal of the lamp holder is electrically connected to the live wire and one of the two lamp foot interfaces located at the other terminal of the lamp holder is electrically connected to the neutral line, then the first rectifying unit DB1 or the second rectifying unit DB2 connected to the live wire only uses half of the circuit and the second rectifying unit DB2 or the first rectifying unit DB1 connected to the neutral line only uses half of the circuit.

Still referring to FIG. 7, based on above embodiments, In one embodiment, the short circuit protection unit is connected in series between at least one of the first rectifying units DB1 and the first power input terminal of the LED driving circuit (FIG. 7 exemplarily shows one short circuit protection unit (indicated by F1) connected to the first power input terminal of the LED driving circuit), so as to achieve short circuit protection for the LED driving circuit.

Still referring to FIG. 7, based on above embodiments, In one embodiment, the first filtering unit 200 includes a second capacitor C2, a third capacitor C3, a first inductor L1, a second inductor L2, a fifth resistor R5 and a sixth resistor R6. The first capacitor C1 is electrically connected between the output terminal of the rectifying unit 100 and the second input terminal of the impedance detection and protection unit 400. The second capacitor C2 is electrically connected between the input terminal of the voltage converting unit 300 and the second ground wire. The first inductor L1 is connected with the fifth resistor R5 in parallel. A first terminal of the first inductor L1 is electrically connected to the output terminal of the rectifying unit 100. A second terminal of the first inductor L1 is electrically connected to the input terminal of the voltage converting unit 300. The second inductor L2 is connected with the sixth resistor R6 in parallel. A first terminal of the second inductor L2 is electrically connected to the second input terminal of the impedance detection and protection unit 400. A second terminal of the second inductor L2 is electrically connected to the second ground wire, so as to eliminate EMI in the circuit.

Still referring to FIG. 7, based on above embodiments, In one embodiment, the output terminal of the first filtering unit 200 includes a first output terminal 231 and a second output terminal 232. The second output terminal 232 of the first filtering unit 200 is electrically connected to the second ground wire. The LED driving circuit further includes a second filtering unit 500. The voltage converting unit 300 further includes a first control chip U1, a transformer T1 and a first switch unit Q1. A first terminal T1-1 of a primary coil of the transformer T1 is electrically connected to the first output terminal 231 of the first filtering unit 200 and the first terminal 501 of the second filtering unit 500 through a first diode D1, and a second terminal T1-2 of the primary coil is electrically connected to the second terminal 502 of the second filtering unit 500. A first terminal of the first switch unit Q1 is electrically connected to the first terminal T1-1 of the primary coil, and a second terminal of the first switch unit Q1 is electrically connected to the second ground wire through a seventh resistor R7. A control signal output terminal GATE of the first control chip U1 is electrically connected to a control terminal of the first switch unit Q1, so as to control the magnitude of the output voltage by controlling connection and disconnection of the first switch unit Q1.

Specifically, a pulse-width modulation (PWM) control chip can be adopted as the first control chip U1, such as the model of an adopted chip is CHIC6001. Due to the energy storage function of the transformer T1, the voltage of the seventh resistor R7 may be increased slowly. After a sampling terminal PSNP of CHIC6001 performs sampling, compared with a reference voltage in CHIC6001, when the reference voltage is reached, a PWM signal is emitted from the interior of CHIC6001 to disconnect the first switch unit Q1. Due to the energy storage function of the transformer T1, a load is discharged continuously through the first diode D1. When the voltage divided by a register in CHIC6001 is 0, one working cycle of CHIC6001 is ended and a next cycle is started. Since the transformer T1 has a function of preventing current change, if a switching frequency of the first switch unit Q1 is large enough, such as 50K-80K, then the current can become smooth enough so that the LED tube lamp does not flash.

Still referring to FIG. 7, based on above embodiments, In one embodiment, the LED driving circuit also includes a frequency detection unit 600 and a second switch unit Q2. The first control chip U1 further includes a control signal input terminal BL. An input terminal of the frequency detection unit 600 is electrically connected to the input terminal of the rectifying unit 100 (in FIG. 7, HIF is used to indicate a signal at the input terminal of the rectifying unit 100). A control signal output terminal of the frequency detection unit 600 is electrically connected to the control signal input terminal BL of the first control chip U1 and a control terminal of the second switch unit Q2. A first terminal of the second switch unit Q2 is electrically connected to the second terminal T1-2 of the primary coil of the transformer T1 (in FIG. 7, Q1-D is used to indicate a signal at the second terminal T1-2 of the primary coil of the transformer T1). A second terminal of the second switch unit Q2 is electrically connected to the first ground wire.

A high-frequency input case and a low-frequency input case may exist in existing fluorescent straight lamps. Embodiments of the present disclosure are applicable not only to the high-frequency input case, but also to the low-frequency input case. Exemplarily, the frequency detection unit 600 detects a frequency of input current in real time. If a power supply inputted into the LED driving circuit is high-frequency alternating current, the control signal output terminal of the frequency detection unit 600 outputs a high voltage, the control signal input terminal BL of the first control chip U1 detects the high voltage signal, and the control signal output terminal GATE emits a signal to control the first switch unit Q1 to disconnect. Meanwhile, the second switch unit Q2 is conducted, and the rectifying unit 100, the first filtering unit 200, the second switch unit Q2 and the output terminal of the LED driving circuit form a loop. If a power supply inputted into the LED driving circuit is low-frequency alternating current, the control signal output terminal of the frequency detection unit 600 outputs a low voltage, the control signal input terminal BL of the first control chip U1 detects the low voltage signal, and the control signal output terminal GATE emits a signal to control the first switch unit Q1 to conduct. Meanwhile, the second switch unit Q2 is disconnected, and the rectifying unit 100, the first filtering unit 200, the first switch unit Q1 and the output terminal of the LED driving circuit form a loop. Therefore, whether the actual input is high frequency or low frequency, the circuit can select a corresponding functional unit to enable the LED lamp to operate normally. It should be noted that, the high voltage signal and the low voltage signal are only relative as long as values of the high voltage signal and the low voltage signal meet the above functions when the circuit is designed.

Still referring to FIG. 7, based on above embodiments, In one embodiment, the frequency detection unit 600 includes a fourth capacitor C4, a fifth capacitor C5, a second diode D2, a third diode D3, an eighth resistor R8 and a zener diode Z1. A first terminal of the fourth capacitor C4 is electrically connected to the input terminal of the rectifying unit 100 (in FIG. 7, HIF is used to indicate a signal at the input terminal of the rectifying unit 100). A second terminal of the fourth capacitor C4 is electrically connected to a cathode of the third diode D3. An anode of the third diode D3 is electrically connected to the first ground wire. An anode of the second diode D2 is electrically connected to the cathode of the third diode D3. A cathode of the second diode D2 is electrically connected to a cathode of the zener diode Z1. An anode of the zener diode Z1 is electrically connected to the first ground wire. The fifth capacitor C5 and the eighth resistor R8 are connected with the zener diode Z1 in parallel, so as to detect the frequency of the input current in real time and control the first switch unit Q1 to conduct or the second switch unit Q2 to conduct according to the frequency of the input current.

It should be noted that, FIG. 7 is a circuit diagram illustrating a specific LED driving circuit. See an explanation portion of an LED driving circuit disclosed in the patent CN106793265A for a working principle of a circuit (which is a circuit connected between the first filtering unit 200 and the output terminal of the LED driving circuit) after the first filtering unit 200 in the LED driving circuit in embodiments of the present disclosure as well as unexplained portions.

Embodiments of the present disclosure further provide a tube lamp. The tube lamp includes the LED driving circuit of any embodiment of the present disclosure.

In embodiments of the present disclosure, the grounding terminal of the rectifying unit of the LED driving circuit in the tube lamp is electrically connected to the first ground wire, the input terminal of the impedance detection and protection unit is electrically connected to the second input terminal of the first filtering unit, the grounding terminal is electrically connected to the first ground wire, and the impedance detection and protection unit is configured to detect the impedance between the second input terminal of the first filtering unit and the first ground wire, so as to control the second input terminal of the first filtering unit to connect to or disconnect from the first ground wire according to a magnitude of the detected impedance. Compared to the existing art in which a mechanical switch is adopted, which enables the lamp tube to have a great potential safety hazard, embodiments of the present disclosure achieve electric shock protection by means of the design of the driving circuit, and can disconnect the entire loop once detecting an electric shock risk, thereby reducing the risk and the potential safety hazard when a user uses the tube lamp and improving the safety performance of the tube lamp.

What is claimed is:

1. An LED driving circuit, comprising:
    a rectifying unit comprising an input terminal, an output terminal and a grounding terminal, wherein the grounding terminal of the rectifying unit is electrically connected to a first ground wire;
    a first filtering unit comprising a first input terminal, a second input terminal and an output terminal, wherein the first input terminal of the first filtering unit is electrically connected to the output terminal of the rectifying unit;
    a voltage converting unit comprising an input terminal and an output terminal, wherein the input terminal of the voltage converting unit is electrically connected to the output terminal of the first filtering unit, wherein the voltage converting unit is configured to convert a direct current voltage inputted to the input terminal of the voltage converting unit into another or multiple direct current voltages, and converted voltages are outputted from the output terminal of the voltage converting unit; and
    an impedance detection and protection unit comprising an input terminal and a grounding terminal, wherein the input terminal of the impedance detection and protection unit is electrically connected to the second input terminal of the first filtering unit, the grounding terminal of the impedance detection and protection unit is electrically connected to the first ground wire, and the impedance detection and protection unit is configured to detect an impedance between the second input terminal of the first filtering unit and the first ground wire, so as to control the second input terminal of the first filtering unit to connect to or disconnect from the first ground wire according to a magnitude of the detected impedance.

2. The LED driving circuit according to claim 1, wherein the impedance detection and protection unit is configured to control the second input terminal of the first filtering unit to disconnect from the first ground wire when the impedance between the second input terminal between the first filtering unit and the first ground wire detected by the impedance detection and protection unit is greater than a human impedance, and
    wherein the impedance detection and protection unit is configured to control the second input terminal of the first filtering unit to connect to the first ground wire when the impedance between the second input terminal of the first filtering unit and the first ground wire detected by the impedance detection and protection unit is less than the human impedance.

3. The LED driving circuit according to claim 1, wherein the impedance detection and protection unit is configured to control the second input terminal of the first filtering unit to disconnect from the first ground wire when the impedance between the second input terminal of the first filtering unit and the first ground wire detected by the impedance detection and protection unit is not less than 500 ohms, and
    wherein the impedance detection and protection unit is configured to control the second input terminal of the first filtering unit to connect to the first ground wire when the impedance between the second input terminal of the first filtering unit and the first ground wire is less than 500 ohms.

4. The LED driving circuit according to claim 1, wherein the impedance detection and protection unit comprises an impedance detection chip, a first resistor, a second resistor, a third resistor and a fourth resistor,
    wherein the impedance detection chip comprises a power input terminal, a first voltage monitoring terminal, a second voltage monitoring terminal, a current monitoring terminal, an isolation input terminal and a grounding terminal,
    wherein the power input terminal of the impedance detection chip is electrically connected to the output terminal of the rectifying unit through the first resistor, the first voltage monitoring terminal is electrically connected to the isolation input terminal through the second resistor, two terminals of the third resistor are electrically connected to the first voltage monitoring terminal and the second voltage monitoring terminal respectively, and the current monitoring terminal is electrically connected to the first ground wire through the fourth resistor, and wherein the impedance detection chip is configured to control connection or disconnection between the isolation input terminal and the grounding terminal.

5. The LED driving circuit according to claim 1, wherein the rectifying unit comprises a first rectifying unit and a second rectifying unit, wherein the first rectifying unit comprises two input terminals and two output terminals, wherein the two input terminals of the first rectifying unit are electrically connected to two first power input terminals of the LED driving circuit respectively, one of the two output terminals of the first rectifying unit is electrically connected to the first input terminal of the first rectifying unit, and another of the two output terminals of the first rectifying unit is electrically connected to the first ground wire, and wherein two input terminals of the second rectifying unit are electrically connected to two second power input terminals of the LED driving circuit respectively, one of two output terminals of the second rectifying unit is electrically connected to the first input terminal of the first rectifying unit, and another of the two output terminals of the second rectifying unit is electrically connected to the first ground wire.

6. The LED driving circuit according to claim 5, wherein the LED driving circuit further comprises a first capacitor and at least one short circuit protection unit, wherein the first capacitor is electrically connected between the two input terminals of the second rectifying unit, and the short circuit protection unit is connected in series between at least one of the two input terminals of the second rectifying unit and the second power input terminal of the LED driving circuit.

7. The LED driving circuit according to claim 1, wherein the first filtering unit comprises a second capacitor, a third capacitor, a first inductor, a second inductor, a fifth resistor and a sixth resistor, wherein the first capacitor is electrically connected between the output terminal of the rectifying unit and the second input terminal of the impedance detection and protection unit, and the second capacitor is electrically connected between the input terminal of the voltage converting unit and a second ground wire, wherein the first inductor is connected with the fifth resistor in parallel, a first terminal of the first inductor is electrically connected to the output terminal of the rectifying unit, and a second terminal of the first inductor is electrically connected to the input terminal of the voltage converting unit, and wherein the second inductor is connected with the sixth resistor in parallel, a first terminal of the second inductor is electrically connected to the second input terminal of the impedance detection and protection unit, and a second terminal of the second inductor is electrically connected to the second ground wire.

8. The LED driving circuit according to claim 2, wherein the output terminal of the first filtering unit comprises a first output terminal and a second output terminal, wherein the second output terminal of the first filtering unit is electrically connected to the second ground wire, wherein the LED driving circuit further comprises a second filtering unit, wherein the voltage converting unit further comprises a first control chip, a transformer and a first switch unit, wherein a first terminal of a primary coil of the transformer is electrically connected to the first output terminal of the first filtering unit and a first terminal of the second filtering unit through a first diode, and a second terminal of the primary coil of the transformer is electrically connected to the second terminal of the second filtering unit, wherein a first terminal of the first switch unit is electrically connected to the first terminal of the primary coil of the transformer; and a second terminal of the first switch unit is electrically connected to the second ground wire through a seventh resistor, and wherein a control signal output terminal of the first control chip is electrically connected to a control terminal of the first switch unit.

9. The LED driving circuit according to claim 8, wherein the LED driving circuit further comprises a frequency detection unit and a second switch unit, wherein the first control chip further comprises a control signal input terminal, wherein an input terminal of the frequency detection unit is electrically connected to the input terminal of the rectifying unit, and a control signal output terminal of the frequency detection unit is electrically connected to the control signal input terminal of the first control chip and a control terminal of the second switch unit, and wherein a first terminal of the second switch unit is electrically connected to the second terminal of the primary coil of the transformer, and a second terminal of the second switch unit is electrically connected to the first ground wire.

10. The LED driving circuit according to claim 9, wherein the frequency detection unit comprises a fourth capacitor, a fifth capacitor, a second diode, a third diode, an eighth resistor and a zener diode, wherein a first terminal of the fifth capacitor is electrically connected to the input terminal of the rectifying unit; a second terminal of the fifth capacitor is electrically connected to a cathode of the third diode; and an anode of the third diode is electrically connected to the first ground wire, wherein an anode of the second diode is electrically connected to the cathode of the third diode; a cathode of the second diode is electrically connected to a cathode of the zener diode; and an anode of the zener diode is electrically connected to the first ground wire, and wherein the fifth capacitor and the eighth resistor are connected with the zener diode in parallel.

11. A tube lamp, comprising an LED driving circuit, wherein the LED driving circuit comprises:

a rectifying unit comprising an input terminal, an output terminal and a grounding terminal, wherein the grounding terminal of the rectifying unit is electrically connected to a first ground wire;

a first filtering unit comprising a first input terminal, a second input terminal and an output terminal, wherein the first input terminal of the first filtering unit is electrically connected to the output terminal of the rectifying unit;

a voltage converting unit comprising an input terminal and an output terminal, wherein the input terminal of the voltage converting unit is electrically connected to the output terminal of the first filtering unit, wherein the voltage converting unit is configured to convert a direct current voltage inputted to the input terminal of the voltage converting unit into another or multiple direct current voltages, and converted voltages are outputted from the output terminal of the voltage converting unit; and an impedance detection and protection unit comprising an input terminal and a grounding terminal, wherein the input terminal of the impedance detection and protection unit is electrically connected to the second input terminal of the first filtering unit, the grounding terminal of the impedance detection and protection unit is electrically connected to the first ground wire, and the impedance detection and protection unit is configured to detect an impedance between the second input terminal of the first filtering unit and the first ground wire, so as to control the second input terminal of the first filtering unit to connect to or disconnect from the first ground wire according to a magnitude of the detected impedance.

\* \* \* \* \*